(12) United States Patent
Lin et al.

(10) Patent No.: US 6,499,431 B1
(45) Date of Patent: Dec. 31, 2002

(54) INDOOR AUTOMATIC AQUACULTURE SYSTEM

(75) Inventors: Nan-Ho Lin, Taichung; Shimne Chen, Tao-Yuan, both of (TW)

(73) Assignee: Formosa High-Tech Aquaculture, Inc., Taichung (TW)

( * ) Notice: Subject to any disclaimer, the term of this patent is extended or adjusted under 35 U.S.C. 154(b) by 101 days.

(21) Appl. No.: 10/023,879

(22) Filed: Dec. 21, 2001

(51) Int. Cl.[7] ............................................... A01K 63/04
(52) U.S. Cl. ...................................................... 119/226
(58) Field of Search ............................... 119/226, 224, 119/225, 230, 248, 251, 252

(56) References Cited

U.S. PATENT DOCUMENTS

| | | | | |
|---|---|---|---|---|
| 3,122,126 A | * | 2/1964 | Yamada | |
| 3,523,520 A | * | 8/1970 | Evans | |
| 5,469,810 A | * | 11/1995 | Chiang | 119/248 |
| 5,732,655 A | * | 3/1998 | Baba et al. | 119/230 |
| 5,820,759 A | * | 10/1998 | Stewart et al. | 119/225 |

* cited by examiner

*Primary Examiner*—Thomas Price
(74) *Attorney, Agent, or Firm*—Bacon & Thomas, PLLC

(57) ABSTRACT

An indoor automatic aquaculture system has an indoor breeding pond constructed in a stepwise manner for breeding aquatic or marine products in a staged-breeding approach to increase breeding density and reduce required space. Breeding water is processed in advance by a recirculating water treatment system and water quality is constantly monitored by a water quality monitor and control system to maintain the breeding water at the optimum condition. A movable feed dispensing control system is located above the breeding pond for dispensing feeds evenly thereby to increase breeding survival rate, improve breeding yield and better control breeding product quality.

4 Claims, 4 Drawing Sheets

INDOOR AUTOMATIC AQUACULTURE SYSTEM

FIELD OF THE INVENTION

The present invention relates to an aquaculture system and particularly an indoor aquaculture system that is capable of automatically monitoring water quality, automatically replenishing breeding water and automatically dispensing feeds.

BACKGROUND OF THE INVENTION

Traditional aquaculture systems generally utilize groundwater and adopt outdoor breeding to grow aquatic or marine products. As ground water or sea water being pumped to the breeding ponds has low oxygen content and a great amount of microbes, the breeding aquatic or marine products tend to die easily. Moreover, pumping huge amount of ground water often makes land subsidence and causes erosion of the breeding ponds. In recent years, foul breeding environments and radical weather changes have spawned various viruses that seriously threaten living conditions of the breeding creatures (such as fishes, shrimps, etc.). As a result, survival rate of the breeding creatures drops significantly. In order to resolve the impact of aforesaid deteriorating external environments and ground water to the breeding businesses, indoor breeding and recirculating water aquaculture systems have gained greater awareness and attention these days, and have become hotly pursued research and development subjects.

SUMMARY OF THE INVENTION

The primary object of the invention is to provide an indoor breeding and divided-pool breeding method to overcome the harmful effect resulting from external environments and to improve breeding survival rate.

Another object of the invention is to provide a high density aquaculture system to increase breeding yield.

A further object of the invention is to provide an automatic aquaculture system to facilitate control of breeding water quality and dispensing of feeds in a constant time and quantity manner.

To achieve the foregoing objects, the indoor automatic aquaculture system of the invention mainly includes a set of breeding pond, a recirculating water treatment system, a plurality of feed dispensing apparatus, an external system and an automatic monitor and control system. Breeding creatures are bred in the indoor stepwise breeding pond and are grown is staged manner to increase breeding density and reduce space required. Breeding water is processed in advance by the recirculating water treatment system. Water quality and condition in the breeding pond is constantly monitored by a water quality monitor and control system and is maintained at the optimum condition. The automatic feed dispensing apparatus are movably located above the breeding pond to evenly dispense feeds. By means of aforesaid arrangements, breeding survival rate can be increased and breeding yield can be improved, and breeding water quality can be better controlled.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
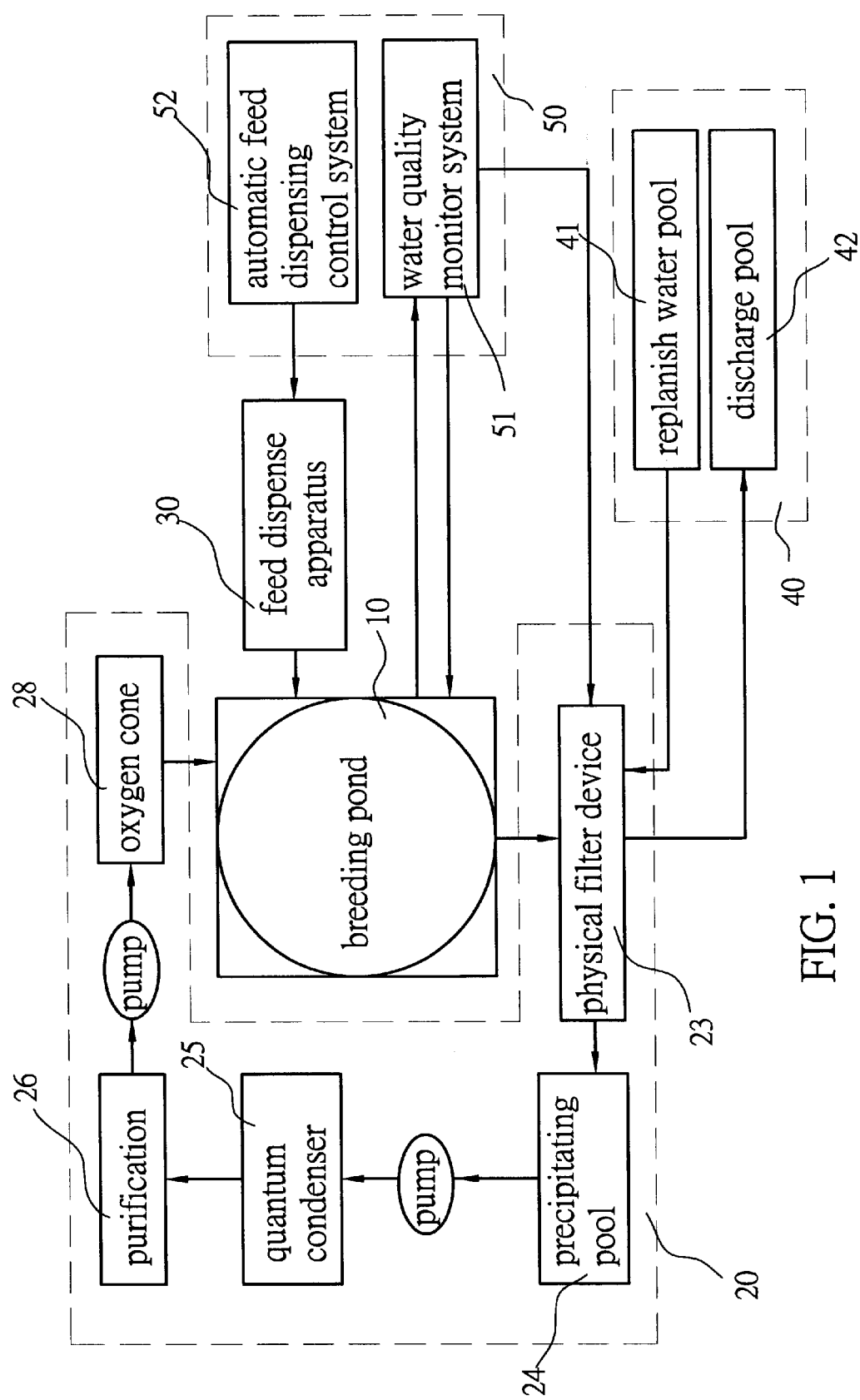
FIG. 1 is a system flowchart of an indoor automatic aquaculture system of the invention.

Referring to FIG. 1 for an embodiment of the invention, the indoor automatic aquaculture system includes at least one set of breeding pond 10, a recirculating water treatment system 20, a plurality of feed dispensing apparatus 30, an external system 40 and an automatic monitor and control system 50.

Figure 2:
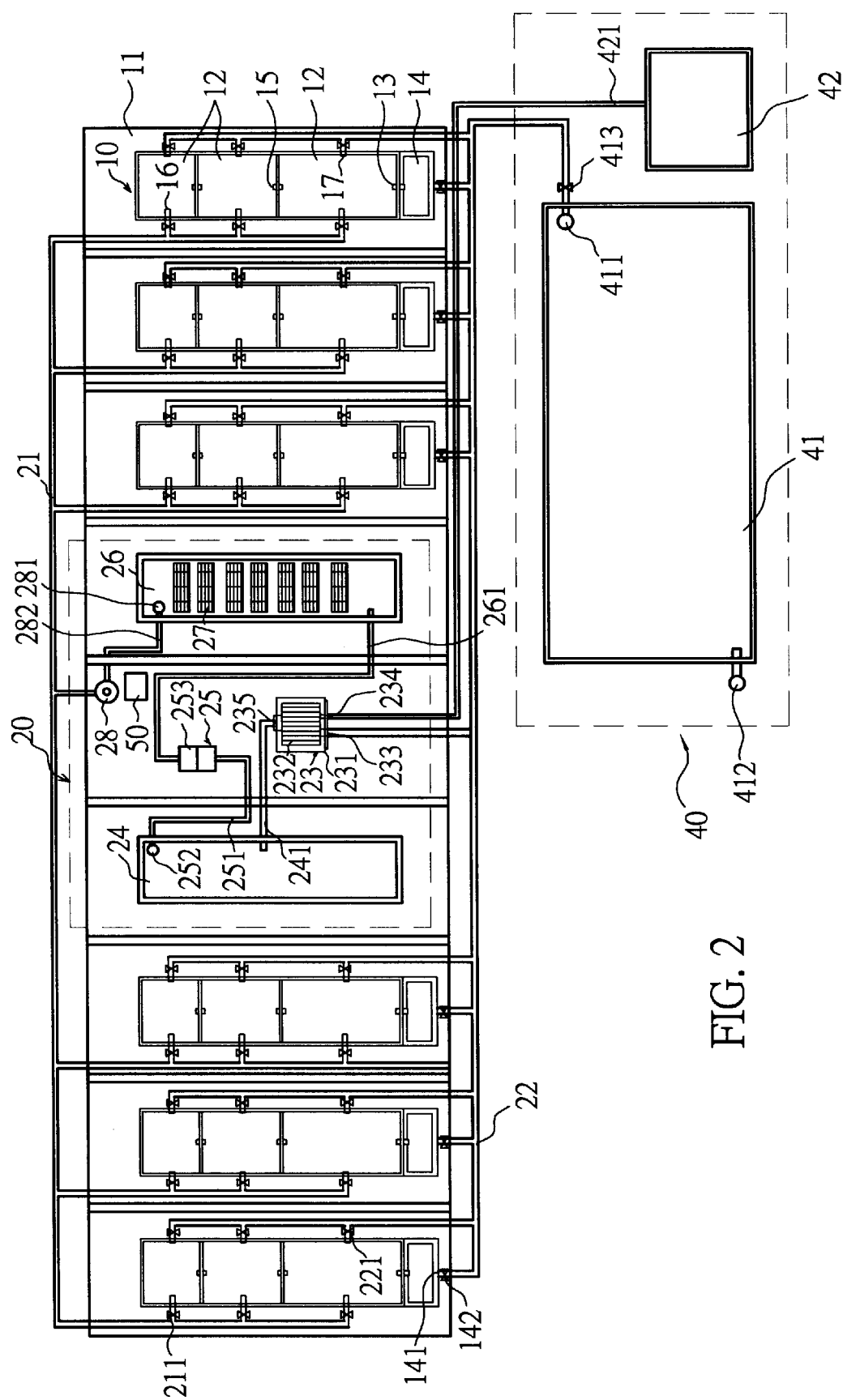
FIG. 2 is a schematic view of an indoor automatic aquaculture system of the invention.
Figure 3:
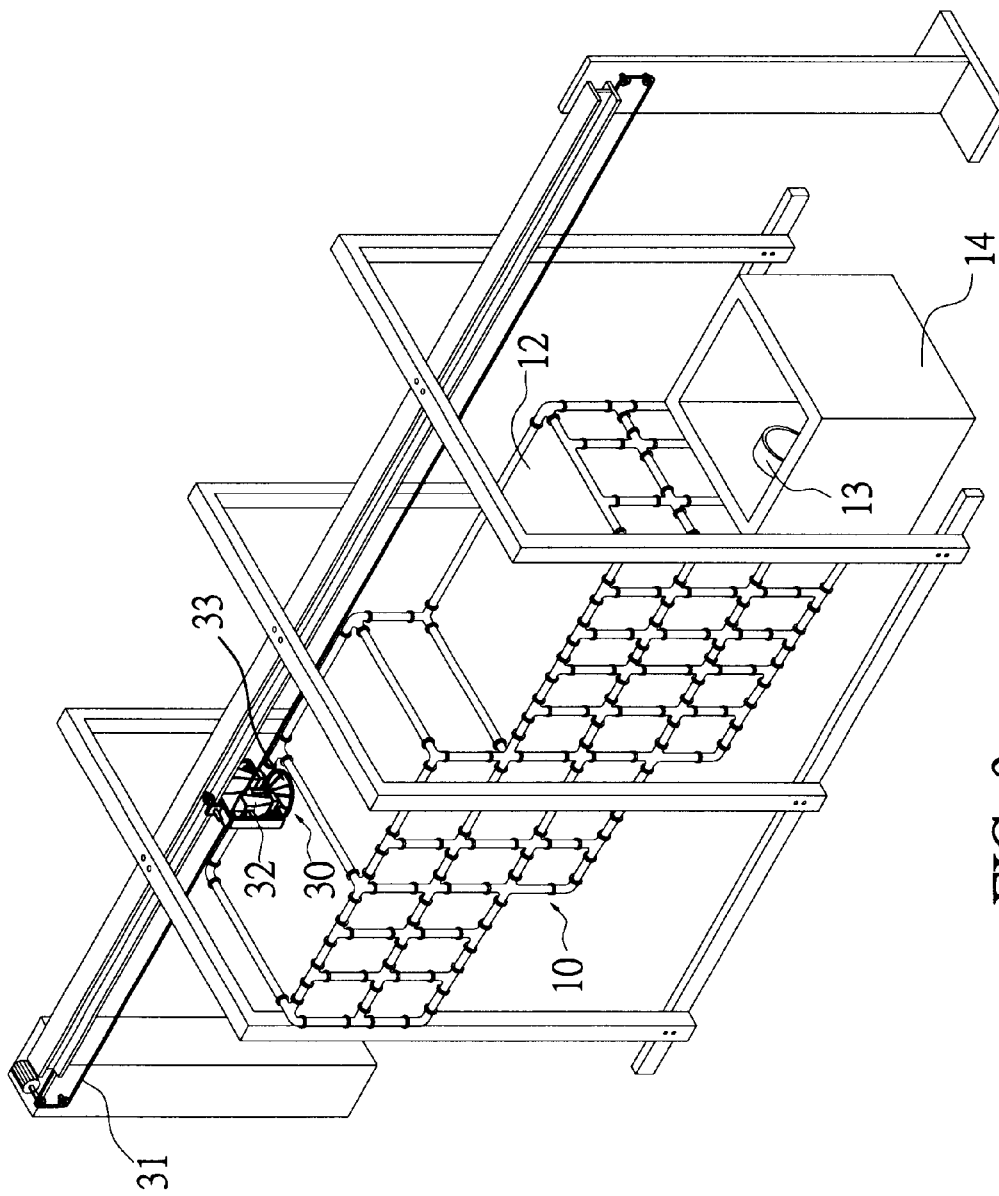
FIG. 3 is a schematic view of a breeding pond and a feed dispensing apparatus of the invention.
Figure 4:
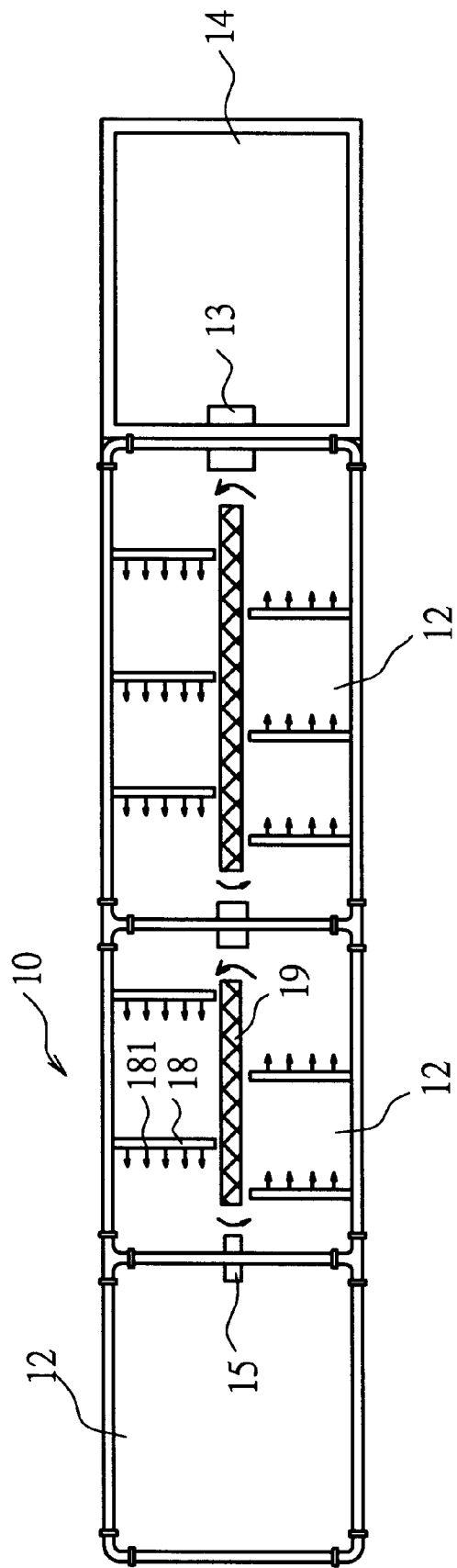
FIG. 4 is a schematic view of a breeding pond of the invention with a return flow design.

The breeding pond 10 (also referring to FIGS. 2 and 3) is housed in an indoor space 11 and laid in a desired configuration with a selected distance between neighboring breeding ponds. Each set of breeding pond 10 includes a plurality of breeding zones 12 constructed in a stepwise manner. The lowest section of the breeding pond 10 has a discharge pipe 13 and a discharge tank 14 located therebelow for collecting the grown breeding creatures. The discharge tank 14 has a discharge outlet 141 and a discharge control valve 142 for controlling and delivering breeding water in the discharge tank 14 to a physical filter device 23 so that the breeding water may be circulated and reused. The breeding zones 12 in the breeding pond 10 are connected by PVC pipes. The bottom and inner surrounding side walls of the breeding zone 12 are covered by plastic sheets. The bottom of the breeding zones 12 are inclined at a selected gradient and are fluidly communicated with one another through communication ducts 15. Every breeding zone 12 has a main water supply inlet 16 and a main discharge water outlet 17 for recirculating water to flow in and out of the breeding pond 10. When the breeding creatures are bred and grow for a selected time period, the breeding creatures may be transferred to neighboring breeding zones 12 through the communication ducts 15. Then a new batch of breeding creatures may be placed in the depleted breeding zone 12. Such a breeding method is called staged and divided-pool breeding method. By means of this method, the breeding time of every breeding zone 12 can be shortened. And the size of the breeding zone 12 can be designed and set according to the sizes of the breeding creatures. Hence annual breeding cycle and breeding density of each set of breeding pond 10 can be increased to increase the breeding yield. Moreover, a design of water return flow may be adopted for water feeding in the breeding pond 10 (as shown in FIG. 4). According to this design, in every breeding zone 12, a plurality of water supply pipes 18 are provided to connect with the main water supply pipe 21 (also shown in FIG. 2). Each water supply pipe 18 has a water outlet 181 located on a side wall thereof. And the breeding zone 12 has a partition 19 located therein. When breeding water flows from the main water supply pipe 21 to the water supply pipes 18, the breeding water will be ejected from the water outlets 181. Because of the baffling of the partition 19, the breeding water will be detoured and generate a return flow. Referring to FIG. 2, the recirculating water treatment system 20 is located in anyone indoor space 11 adjacent to a breeding pond 10, and includes mainly a main water supply pipe 21, a main discharge water pipe 22, a physical filter device 23, a sedimentation pond 24, a quantum electrochemistry machine 25, a water purification pool 26, a plurality of bio filter beds 27 and an oxygen cone 28.

The main water supply pipe 21 connects to a plurality of the main water supply inlets 16 in each breeding pond 10. There is a water supply control valve 211 located between each of the main water supply inlets 16 and the main water supply pipe 21.

The main discharge water pipe 22 is connected to a plurality of the main discharge water outlets 17 of the breeding pond 10. There is a discharge water control valve 221 located between every main discharge water outlet 17 and the main discharge water pipe 22.

The physical filter device 23 is located in the section of the main discharge water pipe 22 and includes a main body 231 and a filter drum 232 located in the main body 23 1, and has a first water supply inlet 233 located at one end to connect the main discharge water pipe 22 and a waste discharge outlet 234 located at the same end, and a first discharge water outlet 235 located at another end thereof.

The sedimentation pond 24 is located at one side of the physical filter device 23 and has a first water supply pipe 241 bridging therebetween. Recirculating water is filtered by filters in the physical filter device 23, then is discharged from the first discharge water outlet 235 through the first water supply pipe 241 to the sedimentation pond 24 for precipitation. The quantum electrochemistry machine 25 is located at one side of the sedimentation pond 24 and has a second water supply pipe 251 bridging therebetween. There is also a first pump 252 located in the sedimentation pond 24 for pumping recirculation water in the sedimentation pond 24. It has a body 253 and a plurality of electrode plates located in the body 253 for removing nitrogen-contained materials and performing sterilization function.

The water purification pool 26 is located at one side of the quantum electrochemistry machine 25 and has a third water supply pipe 261 bridging therebetween. The water purification pool 26 has a plurality of bio filter beds 27 located therein. The bio filter beds 27 contain filters which have microbe membranes growing on the outside surfaces for decomposing ammonia- contained materials in the recirculating water.

The oxygen cone 28 is located in the section of the main water supply pipe 21 and is connected to the water purification pool 26 through a fourth water supply pipe 282 and a second pump 281 located in the water purification pool 26.

The feed dispense apparatus 30 (referring to FIG. 3) are located above the center of the breeding pond 10, and are driven transversely along the breeding pond 10 by means chains 31. Each of the feed dispense apparatus 30 includes two feeding troughs 32 and a rotary disk 33 rotated and controlled by a rotor for evenly dispensing feeds in the breeding pond. The external system 40 (also referring to FIG. 2) is located outside the breeding pond 10, and includes a replenish water pool 41 and a discharge pool 42. The replenish water pool 41 is located in the section of the main discharge water pipe 22, and includes a third pump 411 connecting the main discharge water pipe 22 and a fourth pump 412 to draw sea water. There is an external feed water control valve 413 located between the third pump 411 and the main discharge water pipe 22. The replenish water pool 41 is to precipitate sea water impurities and provides water for breeding use. The discharge pool 42 is located at one side of the replenish water pool 41 and connects to the waste discharge outlet 234 of the physical filter device 23 through a waste discharge pipe 421. Wastes and sludge in the physical filter device 23 are discharged through the waste discharge outlet 234 and waste discharge pipe 421 to the discharge pool 42.

The automatic monitor and control system 50 is located beside the recirculating water treatment system 20 in anyone of the indoor space 11, and includes a water quality monitor and control system 51 and an automatic feed dispensing control system 52. Referring to FIG. 1, the water quality monitor and control system 51 employs a microprocessor and a plurality of sampling pumps located in the breeding pond 10 to measure water temperature, oxygen content, acid-alkali value, and oxidization and reduction of breeding water in the breeding pond 10. The reading of the measured data may be shown on a display device of the microprocessor and may be used to control operations of the recirculating water treatment system 20. Measurement and transmission of breeding water data performed by the water quality monitor and control system 51 may also be done through the Internet to achieve remote controlling and monitoring of the breeding system. The automatic feed dispensing control system 52 is for setting operations of the feed dispense apparatus 30 to allow the feed dispense apparatus 30 dispensing and distributing feeds in the breeding pond 10 in a constant time and quantity fashion.

Referring again to FIG. 1, the breeding pond 10 of the invention is located indoors to reduce impact on the breeding creatures resulting from changes of external environments (such as temperature and acid rain). The breeding pond 10 may be constructed and arranged in a stepwise manner and adopted a staged-breeding approach. Thus breeding density can be increased and space requirement can be decreased. In addition, breeding water is physically filtered in advance through the recirculating water treatment system 20 (by means of the physical filter device 23), has nitrogen-contained materials removed and is sterilized (by means of the quantum electrochemistry machine 25), has enriched oxygen content (by means of the oxygen cone 28), and has the ammonia-contained materials decomposed (by means of the bio filter beds 27) before delivering to the breeding pond 10. Hence breeding water quality is greatly improved. Moreover, the water quality monitor and control system 51 constantly monitors water quality in the breeding pond 10, and based on water quality conditions controls operations of the recirculating water treatment system 20 to replace or replenish breeding water to maintain breeding water at the optimum condition. As a result, breeding survival rate can be increased. Furthermore, the automatic feed dispense control system 52 can automatically control and dispense feeds by centrifugal force in a constant time and quantity fashion. The dual feeding trough 32 and the overhead movement of the feeding dispense apparatus 30 above the breeding pond 10 allow even dispensing of the feeds and allow breeding creatures to grow evenly. Thus by means of the indoor breeding system of the invention, breeding survival rate can be improved to increase breeding yield, and breeding water quality can be controlled easily, and feeds can be dispensed in a constant time and quantity manner.

The following table shows comparisons of breeding white shrimps by utilizing the invention and a conventional breeding system:

|  | The Invention | Conventional System |
| --- | --- | --- |
| Area size required for growing 50 ton | 1 hectares | 12.5 hectares |

-continued

|  | The Invention | Conventional System |
|---|---|---|
| annually | | |
| Annual harvesting frequency | 7 times | 2 times |
| Harvest method | Easy | Difficult |
| Grown product quality | Feeds are evenly dispensed; Breeding products grow with even sizes. | Feeds are not evenly dispensed; Breeding products grow with not even sizes. |
| Growing Yield | Indoor breeding, does not affect by external environments. Stable growing yield. | Growing yield varies depending on external environments. |
| Investment return time | Stable growing yield. Investment returns between 2–4 years. | Not stable growing yield. Investment return time is difficult to assess. |
| Weather & acid rain impact. | Indoor breeding, no impact. | Outdoor breeding, great impact |
| Soil variation impact | Breeding pond is covered by plastic sheets, no impact. | Breeding pond bottom is naked soil, great impact. |
| Cold current | Automatic temperature control. | No temperature control |
| Filtering method | Physical filter device & bio filter beds. | Directly pumps ground water or sea water for breeding, no filtering. |
| Water consumption | Breeding by recirculating water, consumes less water. | Directly pumps ground water or sea water for breeding, consumes large amount of water. |
| Disease prevention | Sterilized by electrolysis | No sterilization. |
| Control system | Computer automatic control. | None. |
| Feeds supply method | Dispensed by automatic feed dispense apparatus. | Manual |
| Water recirculation | Computer controlled breeding water replenishment. | None. |
| Breeding and harvest time | Plannable | Depends on weather conditions. |

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An indoor automatic aquaculture system, comprising:
at least one set of breeding pond housed in an indoor space at a selected distance with one another including a plurality of breeding zones laid in a stepwise manner, a discharge pipe located at a lowest section thereof, and a discharge tank located therebelow for collecting grown breeding creatures;

a recirculating water treatment system located in a selected indoor space adjacent to the breeding pond for processing recirculating water for the breeding pond including a physical filter device, a sedimentation pond, a quantum electrochemistry machine, an oxygen cone, a water purification pool, and a plurality of bio filter beds;

a plurality of feed dispense apparatus driven transversely along the breeding pond a chain means chains for dispensing feeds in a rotary manner to the breeding pond;

an external system located outside the breeding pond including a replenish water pool for storing breeding water drawn from outside and a discharge pool for containing discharged wastes; and an automatic monitor and control system located beside the circulating water treatment system in a selected indoor space including a water quality monitor and control system and an automatic feed dispensing control system.

2. The indoor automatic aquaculture system of claim 1, wherein the breeding pond has a frame fastened by PVC tubes and a bottom and inner surrounding side walls covered by plastic sheets.

3. The indoor automatic aquaculture system of claim 1, wherein the water monitor and control system includes a microprocessor and a plurality of sampling pumps located in the breeding pond for measuring water temperature, oxygen content, acid-alkali value, and oxidization and reduction of breeding water in the breeding pond to control operations of the recirculating water treatment system.

4. The indoor automatic aquaculture system of claim 1, wherein the automatic feed dispensing control system controls the feed dispense apparatus for dispensing feeds in the breeding pond in a constant time and quantity fashion.

* * * * *